Nov. 14, 1961 G. E. TANKER ET AL 3,008,602
CYLINDER BOSS
Filed Aug. 4, 1958

INVENTORS
GEORGE E. TANKER
& NORBERT C. BEERLI.
BY RICHEY, McNENNY & FARRINGTON
ATTORNEYS

United States Patent Office 3,008,602
Patented Nov. 14, 1961

3,008,602
CYLINDER BOSS
George E. Tanker, South Euclid, and Norbert C. Beerli, Chesterland, Ohio, assignors to The Weatherhead Company, Cleveland, Ohio, a corporation of Ohio
Filed Aug. 4, 1958, Ser. No. 752,736
3 Claims. (Cl. 220—85)

This invention relates generally to pressure cylinders and more particularly to an improved cylinder and cylinder boss structure.

In the past, it has been customary to form cylinder bosses as a unitary structure wherein the boss serves two functions, first to provide a threaded attachment for a cylinder valve or the like, and second to provide a larger threaded portion onto which a valve protecting cap can be threaded. Normally a single weld is used to attach this type of boss to the cylinder and any impacts on the protective cap put a strain on the weld, and in some cases the weld is broken causing leakage. In addition, such bosses are expensive to manufacture since they require a great deal of machining.

In a cylinder boss structure according to this invention, the cylinder boss ring and valve spud are two separate elements which are welded separately to the cylinder. The boss ring is welded to the outer surface of the cylinder and does not require a continuous or fluid-tight weld. The valve spud is welded to the edges of a hole through the cylinder wall, the hole being smaller than and located within the boss ring. The spud is secured by a continuous fluid-tight weld of sufficient strength to withstand the loads created by the pressure fluid within the cylinder, and the shocks and stresses of installation and use of a cylinder valve, without cracking or leaking.

With this arrangement, the weld connecting the valve spud to the cylinder is protected from blows or stresses which may be applied to the valve protecting cap, such forces being transmitted to the cylinder wall without passing through the weld of the valve spud, so that such forces do not cause cracking or leakage of the spud weld. Also, since the spud weld encloses an area relatively small compared to the area enclosed by the boss ring, the fluid pressure loads which must be resisted by the spud weld are also relatively small.

It is an important object of this invention to provide a new and improved cylinder boss assembly wherein the boss ring is separate from the valve spud.

It is another important object of this invention to provide a cylinder boss assembly wherein the boss ring is relatively resilient so that it is capable of absorbing impacts and the like without cracking its welded connection to the cylinder, and without transmitting the impact forces to the spud and valve threaded thereinto.

It is still another object of this invention to provide a cylinder boss assembly wherein the boss ring is welded to the tank at points spaced from the valve spud of the assembly by a separate weld so that impacts on the boss ring will not stress the spud weld.

It is still another object of this invention to provide a cylinder boss assembly which can be formed by low cost high production stamping methods.

Further objects and advantages will be apparent from the following description and drawings, wherein, FIG. 1 is a perspective view of a cylinder boss assembly according to this invention installed on a pressure cylinder, the valve protecting cap being shown in phantom;

Figure 1:
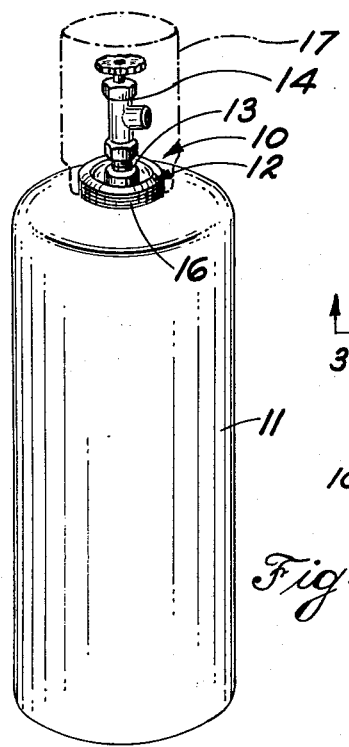
Figure 2:
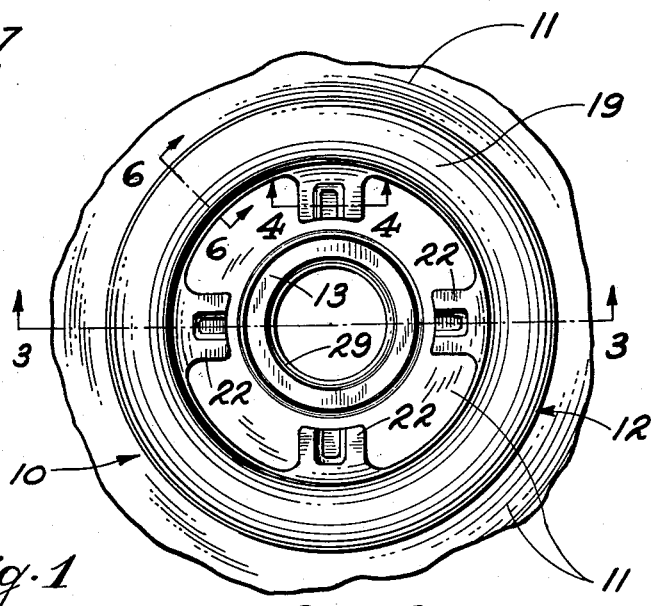
FIG. 2 is an enlarged fragmentary plan view of the valve spud and boss ring mounted on the cylinder.
Figure 6:
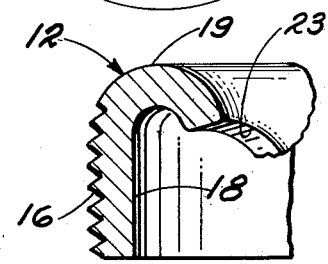
FIG. 6 is a section taken along line 6—6 of FIG. 2.

Referring to the drawings, the cylinder boss assembly 10 according to this invention can be used with any form of pressure cylinder, one of which is illustrated as a cylindrical tank 11 in FIG. 1. The cylinder boss assembly 10 is mounted on the end of the tank and includes a boss ring 12 and a smaller diameter spud 13 formed with internal threads into which a valve 14 is threaded. The external surface of the boss ring 12 is threaded as at 16 to receive a valve protecting cap shown in phantom at 17.

Referring now to FIGS. 2 through 6, the boss ring 12 is preferably formed of a stamping having a cylindrical skirt portion 18 on which the threads 16 are formed. The skirt portion 18 terminates at its upper end in a reverse bend portion 19 connecting the cylindrical portion 18 to an inner skirt 21.

In the preferred embodiment, spaced welding points for the boss ring are provided by a plurality of legs 22 projecting radially inward from the inner skirt portion 21. As shown, there are four such legs 22, but a greater or a lesser number can be used as desired. The portions of the skirt 21 between the legs 22 are cut out as at 23 to provide ventilation and drainage for the zone within the boss ring 12 and, in addition, to make the leg structure more flexible so that it can resiliently absorb impacts.

The cylinder 11, the boss ring 12 and the spud 13 are made of any suitable weldable metal, preferably steel.

Preferably, projection welding is used to secure the spud and the boss ring to the cylinder, although other types of welding may be used if desired. As shown, the legs 22 are formed with pressed out welding projections 24 of relatively small area. To secure the boss ring, it is positioned correctly on the cylinder coaxial with an opening 28 through the cylinder wall, the lugs 24 are pressed against the outer surface of the end wall of the cylinder, and electric welding current is passed momentarily between the cylinder and the boss ring, fusing the contacting surfaces of the lugs 24 and the wall of the cylinder and thereby welding each of the legs 22 to the cylinder.

Figure 7:
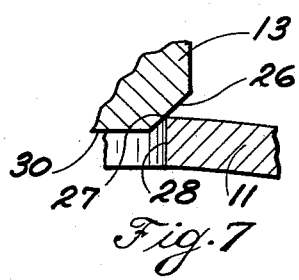
FIG. 7 is a fragmentary view of the joint between the spud and the cylinder prior to welding.
Figures 4, 5:
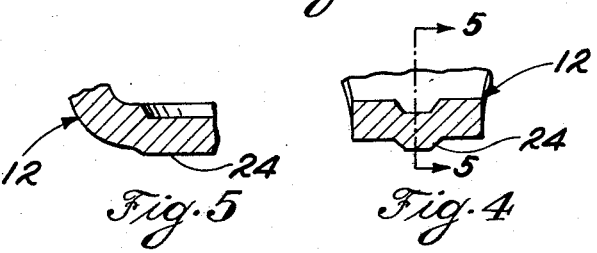
FIG. 4 is an enlarged fragmentary section of the boss ring taken along line 4—4 of FIG. 2 showing the shape of the attachment portion of the boss ring before it is welded to the wall of the tank.
FIG. 5 is a section taken along line 5—5 of FIG. 4.

The spud 13 is also welded to the tank 11, preferably by projection welding. Prior to welding, the spud 13 is formed with a conical surface 26 illustrated in FIG. 7 which engages, and is pressed against, an outer annular corner 27 formed at the junction of the outer surface of the tank 11 and the aperture 28 through the wall of the tank into which the spud is welded. Electric welding current is passed between the spud 13 and the tank 11 and a high current concentration occurs at the annular line engagement between the corner 27 and the conical surface, fusing together the metal of the spud and the cylinder wall. The pressure and the welding current are maintained until the metal of the spud and the cylinder fuse into a complete annular band of substantial width, preferably bringing the inner end of the spud substantially flush with the inner wall of the cylinder, as shown in FIG. 3.

In this way the weld between the spud 13 and the wall of the cylinder extends completely through the thickness of the cylinder wall so that the weld has ample strength to withstand any fluid pressure within the capacity of the cylinder itself. Any possibility of leakage through the weld is also avoided by welding in this way so as to provide continuous annular weld extending across the complete thickness of the cylinder wall.

The legs 22 are proportioned so that they are welded to the tank 11 at points spaced from the spud 13 so that any impacts on the cap 17 threaded on the boss ring are not transmitted to the weld connecting the spud 13 to the tank 11. In addition, the weld between the spud 13 and the tank 11 encloses a relatively small area because the spud 13 has a smaller diameter than the boss ring 12, and it is only this area which is subjected to the fluid under pressure. The preferred structure according to this invention has the additional advantage of permitting the boss assembly to be formed and mounted on the tank by the use of low cost, high production methods of manufacture.

Figure 3:
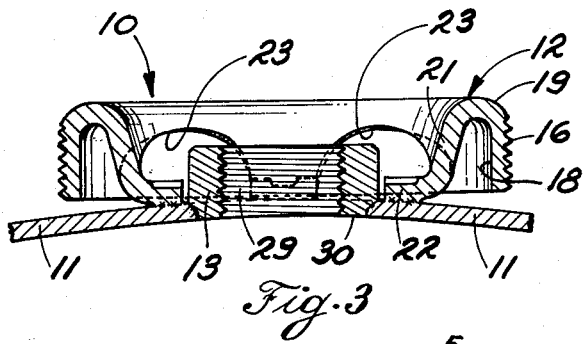
FIG. 3 is a cross section taken along line 3—3 of FIG. 2.

As shown in FIG. 3, the spud 13 is formed with internal threads 29 throughout its length which may be, and preferably are, cut before the spud is welded to the cylinder. The conical surface 26 extends only part way through the side wall of the spud 13, leaving an annular end wall portion 30 surrounding the threads which is not affected or deformed by the welding and which protects the threads from spatter or the like.

The boss ring 12 and the spud 13 may be welded to the cylinder successively or may be welded simultaneously with separate circuits and controls. Preferably the spud 13 is welded first so that the annular edge 27 cannot be affected in any way by the welding of the ring 12.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

What is claimed is:

1. A tank and cylinder boss combination comprising a tank having a wall formed with an aperture, a boss ring having a cylindrical skirt adapted to receive a protective cap and formed with a plurality of legs projecting radially inward and having their under surfaces welded to said wall at points spaced from said aperture, said legs maintaining said ring spaced from said wall and providing a connection therebetween permitting limited relative movement between said ring and wall, and a tubular valve spud welded into said aperture formed with connecting means adapted to receive a valve.

2. A tank and cylinder boss assembly comprising a tank having a wall formed with an aperture, a boss ring having a threaded cylindrical skirt joined at its upper end to an inner skirt, a plurality of depending resilient legs extending from said inner skirt welded to said wall at points symmetrically around and spaced from said aperture, and an internally threaded tubular valve spud welded into said aperture.

3. A tank and cylinder boss combination comprising a tank having a wall formed with an aperture, a boss ring having a cylindrical skirt adapted to receive a protective cap and being joined at its upper end to an inner skirt, said inner skirt being formed with a plurality of resilient legs welded to said wall at points spaced from said aperture, said legs maintaining said ring spaced from said wall and providing a connection therebetween permitting limited relative movement between said ring and wall, the spacing of said ring from said wall providing drainage and ventilation openings into the interior of said ring between said legs, and a tubular valve spud welded into said aperture formed with connecting means adapted to receive a valve.

References Cited in the file of this patent

UNITED STATES PATENTS

| 2,664,222 | King | Dec. 29, 1953 |

FOREIGN PATENTS

| 514,045 | Belgium | Jan. 1, 1953 |
| 187,103 | Austria | Oct. 25, 1956 |
| 503,330 | Italy | Dec. 4, 1954 |